United States Patent [19]
Shibuya

[11] Patent Number: 5,777,399
[45] Date of Patent: Jul. 7, 1998

[54] PORTABLE ELECTRONIC APPARATUS AND CHARGE CONTROLLING METHOD FOR PORTABLE ELECTRONIC APPARATUS

[75] Inventor: Toshiyuki Shibuya, Tokyo, Japan

[73] Assignee: NEC Corporation, Tokyo, Japan

[21] Appl. No.: 763,987

[22] Filed: Dec. 10, 1996

[30] Foreign Application Priority Data

Dec. 14, 1995 [JP] Japan .................................. 7-325670

[51] Int. Cl.⁶ ...................................................... H02J 9/06
[52] U.S. Cl. .............................. 307/66; 307/64; 320/137; 320/160; 320/144; 364/492
[58] Field of Search ........................ 307/66, 64, 150; 320/2, 3, 11, 19, 21, 22, 43; 364/492

[56] References Cited

U.S. PATENT DOCUMENTS

| | | | |
|---|---|---|---|
| 4,595,872 | 6/1986 | Ball | 320/13 |
| 4,885,523 | 12/1989 | Koenck | 320/21 |
| 5,461,262 | 10/1995 | Hirasawa et al. | 320/21 |
| 5,498,949 | 3/1996 | Dowe | 320/11 |

FOREIGN PATENT DOCUMENTS

| | | |
|---|---|---|
| 1-144327 A | 6/1989 | Japan . |
| 3-40728 A | 2/1991 | Japan . |
| 2 242 793 | 10/1991 | United Kingdom . |
| 2 262 004 | 6/1993 | United Kingdom . |
| 2 262 668 | 6/1993 | United Kingdom . |
| WO 92/09130 | 5/1992 | WIPO . |

*Primary Examiner*—Brian Sircus
*Assistant Examiner*—Albert W. Paladini
*Attorney, Agent, or Firm*—Scully, Scott, Murphy & Presser

[57] ABSTRACT

Since means (control terminal a 16, control terminal b 17, control terminal c 18 and voltage detection terminal 22) for controlling portable electronic apparatus charger 2 directly from CPU 13 in the inside of portable electronic apparatus body 1 is provided, the circuit scale is reduced. Further, since means (power supply detection circuit 6, switch a 7, switch b 8 and regulator a 9) for supplying an electric current to CPU 13 to allow CPU 13 to operate with a signal from sub clock 11 even when the power supply to portable electronic apparatus body 1 is in an off state is provided, if portable electronic apparatus body 1 is connected to portable electronic apparatus charger 2, then CPU 13 and only a limited number of the other circuits in the inside of portable electronic apparatus body 1 are allowed to operate as a control circuit for portable electronic apparatus charger 2.

4 Claims, 5 Drawing Sheets

PORTABLE ELECTRONIC APPARATUS AND CHARGE CONTROLLING METHOD FOR PORTABLE ELECTRONIC APPARATUS

BACKGROUND OF THE INVENTION

1. Field of the Invention

This invention relates to a portable electronic apparatus and a charge controlling method for a portable electronic apparatus, and more particularly to a portable electronic apparatus and a charge controlling method for a portable electronic apparatus wherein charging of a battery built or loaded in a portable electronic apparatus body is permitted if the portable electronic apparatus body and a charger for a portable electronic apparatus are connected to each other even when the power supply for the portable electronic apparatus body is off.

2. Description of the Related Art

Figure 1:
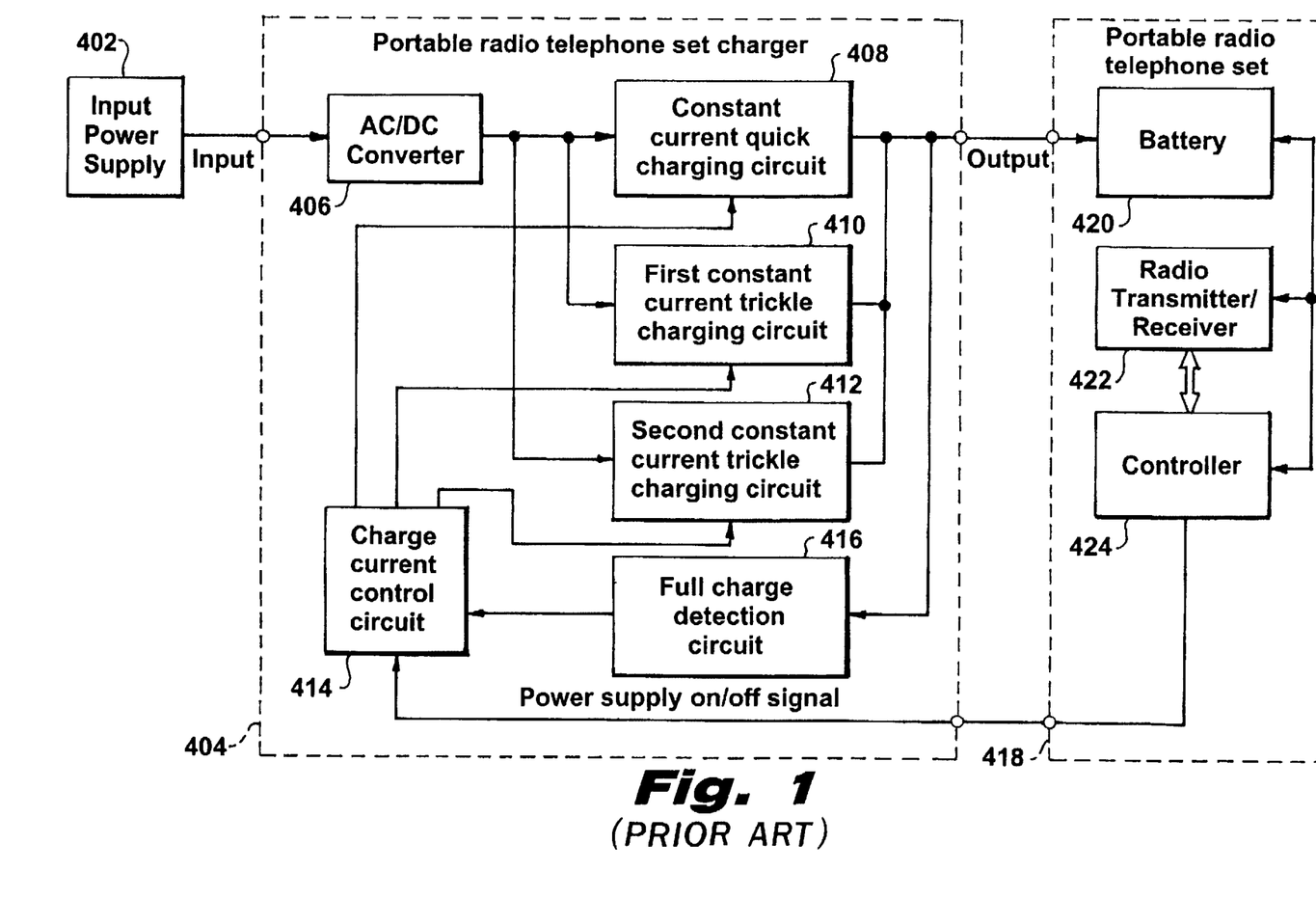
FIG. 1 is a block diagram showing a connection between a portable radio telephone set and a charger for a portable radio telephone set as the prior art.

Conventionally, a portable electronic apparatus which has a battery built or loaded therein requires means for charging the battery, and as seen from a charger for a portable radio telephone set disclosed in Japanese Patent Laid-Open Application No. Heisei 3-40728, charge control for preventing overcharge of a battery upon quick charge or preventing exhaustion of a battery when a portable radio telephone set is connected to a charger for a portable radio telephone set is performed using a charge current control circuit and a constant current quick charging circuit, a first constant current trickle charging circuit and a second constant current trickle charging circuit built in the charger for a portable ratio telephone set connected to the portable radio telephone set. FIG. 1 is a block diagram of a connection between a portable radio telephone set and a charger for a portable radio telephone set which is the prior art disclosed in the document mentioned above. Referring to FIG. 1, reference numeral 402 denotes an input power supply, 404 a portable radio telephone set charger, 406 an AC/DC converter, 408 a constant current quick charging circuit, 410 a first constant current trickle charging circuit, 412 a second constant current trickle charging circuit, 414 a charge current control circuit, 416 a full charge detection circuit, 418 a portable radio telephone set, 420 a battery, 422 a radio transmitter/receiver, and 424 a controller.

If portable radio telephone set 418 is connected to portable radio telephone set charger 404 as shown in FIG. 1, then charge current control circuit 414 built in portable radio telephone set charger 404 turns on constant current quick charging circuit 408 so that battery 420 attached to or loaded in portable radio telephone set 418 is charged quickly. If full charge detection circuit 416 in portable radio telephone set charger 404 detects full charge of battery 420, then charge current control circuit 414 turns off constant current quick charging circuit 408. Thereafter, if the power supply for portable radio telephone set 418 is on, then charge current control circuit 414 turns on second constant current trickle charging circuit 412 in portable radio telephone set charger 404. Thereupon, second constant current trickle charging circuit 412 supplies electric current which is a sum of an electric current equal to one twentieth the capacity of battery 420 and an electric current corresponding to power consumed by portable radio telephone set 418 while portable radio telephone set 418 waits for termination of a call (the electric current will be hereinafter referred to as waiting current) to battery 420 to trickle charge battery 420. If the power supply for portable radio telephone set 418 is off, then charge current control circuit 414 turns on first constant current trickle charging circuit 410 in portable radio telephone set charger 404 to trickle charge battery 420 with an electric current equal to one twentieth the capacity of battery 420.

Figure 2:
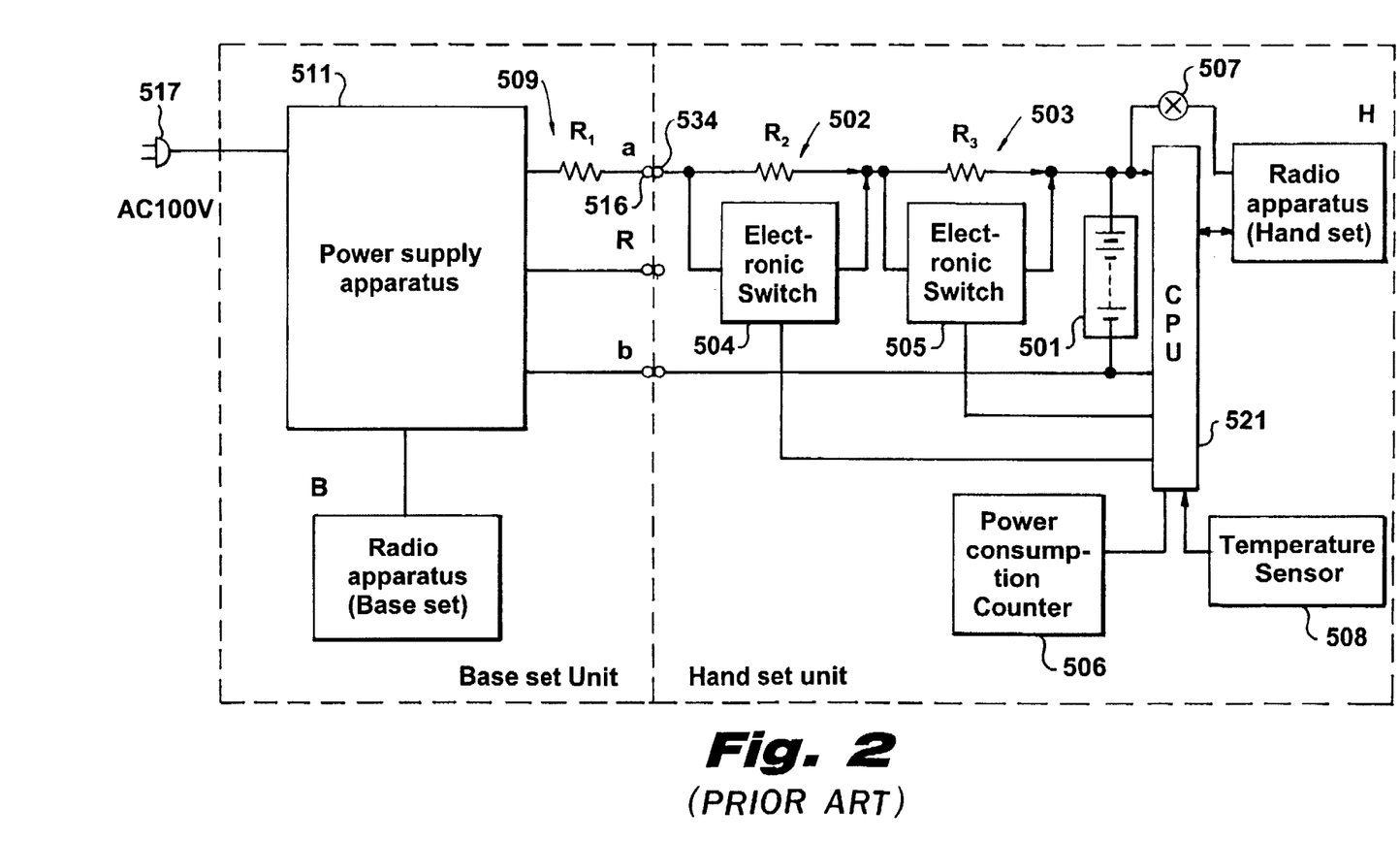
FIG. 2 is a block diagram showing a general construction of a charger for a cordless telephone set as the prior art.

Meanwhile, FIG. 2 is a block diagram showing a general construction of a charging apparatus for a cordless telephone set which is the prior art disclosed in Japanese Patent Laid-Open Application No. Heisei 1-144327. Referring to FIG. 2, reference numeral 501 denotes a built-in battery, reference numerals 502, 503 and 509 denote series resistors, 504 and 505 electronic switches, reference numeral 506 denote a power consumption counter, 507 a power supply switch for a radio apparatus (hand set), 508 a temperature sensor, 511 a power supply apparatus, reference numerals 516 and 534 denote charge terminals, reference numeral 517 denote an AC 100 V power supply, and 521 a controller (CPU) which effects operation control and charge control of the hand set unit.

As recognized from the charging method for an electronic apparatus of the document mentioned above, using CPU 521 and power consumption counter 506 built in the portable side apparatus (hereinafter referred to as hand set unit) of the cordless telephone set and a power supply circuit built in the fixed side apparatus (hereinafter referred to as base set unit), consumed power is recorded, and charge control for preventing overcharge of a battery upon quick charge or preventing exhaustion of a battery of the hand set unit when the hand set unit is connected to the base set unit and operates in this state is effected. As seen from FIG. 2, an amount of electric current flowing out from battery 501 is estimated and counted in a decrementing direction by power consumption counter 506 of the hand set unit. In this instance, CPU 521 controls the counting speed of power consumption counter 506 so that power consumption counter 506 counts slowly when the telephone set is in a call waiting state but counts fast when the telephone set is in a communicating state. If the hand set unit and the base set unit are connected to each other, then charge terminal 534 of the hand set unit and charge terminal 516 of the base set unit are connected to each other, and CPU 521 turns on electronic switches 504 and 505 in response to information from power consumption counter 506 to apply the output of power supply apparatus 511 of the base set unit to built-in battery 501 to effect charging of built-in battery 501. The resistance value of series resistor 509 is adjusted so that, in this instance, electric current equal to approximately 1.5 times the electric current consumed when the telephone set is in a communicating state may flow. When the hand set unit is put into a communicating state, CPU 521 turns on electronic switch 504 to apply the output of power supply apparatus 511 of the hand set unit to built-in battery 501 to effect charging of built-in battery 501. The total resistance value of the resistors (R1+R3) is adjusted so that, in this instance, an electric current corresponding to operation power of the hand set unit required when it is communicating may be supplied. When the hand set unit is in a waiting state and charged from power supply apparatus 511 of the hand set unit, CPU 521 controls power consumption counter 506 in an incrementing direction, and when the count value of power consumption counter 506 becomes equal to 0, CPU 521 turns off electronic switches 504 and 505 to enter into a supplementary charging state. The total resistance value of the resistors (R1+R2+R3) is adjusted so that, in this instance, a low electric current corresponding to operation power of battery 501 and some of the circuits may be supplied.

The first problem resides in that, with the prior art, the circuit of the portable electronic apparatus charger is complicated, and where the portable electronic apparatus charger and the portable electronic apparatus body are considered as a whole, an increased number of parts such as, for example, a CPU, is required for the control circuit.

The reason is that a control circuit different from the control circuit provided in the portable electronic apparatus body, for example, the charge current control circuit or the full charge detection circuit provided in the portable radio telephone set charger disclosed in Japanese Patent Laid-Open Application No. Heisei 3-40728, is present in the inside of the portable electronic apparatus charger.

The second problem resides in that, with the technique of the charging method for an electronic apparatus disclosed in Japanese Patent Laid-Open Application No. 1-144327 which is directed to solution of the first problem, a battery cannot be charged when the power supply for the portable electronic apparatus body is off.

The reason is that, as indicated by the charging method for an electronic apparatus disclosed in Japanese Patent Laid-Open Application No. Heisei 1-144327, when the power supply for the portable electronic apparatus body is off, the CPU which controls the portable electronic apparatus charger does not operate.

SUMMARY OF THE INVENTION

It is an object of the present invention to provide a portable electronic apparatus and a charge controlling method for the portable electronic apparatus wherein circuits of a charger for a portable electronic apparatus are reduced in scale and charge of a battery built or loaded in a portable electronic apparatus body is allowed if the portable electronic apparatus body and the charger for a portable electronic apparatus are connected to each other even if the power supply for the portable electronic apparatus body is off.

According to an aspect of the present invention, a portable electronic apparatus which includes a portable electronic apparatus body in which a rechargeable battery is built or loaded and which includes a CPU, and a portable electronic apparatus charger for charging the battery built or loaded in the portable electronic apparatus body, is constructed such that the portable electronic apparatus charger comprises quick charging means having a function of quickly charging the battery, and slow charging means having a function of slowly charging the battery, that the portable electronic apparatus body comprises a power supply switch for switching on or off a power supply to be supplied from the battery to the entire circuitry of the portable electronic apparatus body, connection detection means for detecting connection of the portable electronic apparatus body to the portable electronic apparatus charger, open/close detection means for detecting an on/off state of the power supply switch, and auxiliary power supply means for directly supplying an electric current from the battery to the CPU when the power supply switch is off while charging of the battery is proceeding, and that the CPU has a charge completion detection function of detecting a charged state of the battery from an output voltage of the battery, and a quick/slow switching controlling function of controlling the quick charging means to an on state and controlling the slow charging means to an off state when the charged state detected by the charge completion detection function is insufficient charge but controlling the quick charging means to an off state and controlling the slow charging means to an on state when the charged state detected by the charge completion detection function is sufficient charge.

The portable electronic apparatus may be constructed such that the slow charging means includes two slow charging circuits having different output electric current values, and the CPU has a controlling function for switching the two slow charging circuits in response to an on or off state of the power supply switch detected by the open/close detection means upon slow charging.

According to another aspect of the present invention, a charge controlling method for the portable electronic apparatus described above comprises the steps of detecting connection of the portable electronic apparatus to the portable electronic apparatus charger, detecting an on/off state of the power supply switch and turning off the auxiliary power supply means when the power supply switch is on but turning on the auxiliary power supply means when the power supply switch is off, turning on the quick charging means, detecting a charged state of the battery, and turning off the quick charging means and turning on the slow charging means when the charged state of the battery reaches a predetermined value.

The charge controlling method may comprise the steps of detecting connection of the portable electronic apparatus to the portable electronic apparatus charger, detecting an on/off state of the power supply switch and turning off the auxiliary power supply means when the power supply switch is on but turning on the auxiliary power supply means when the power supply switch is off, turning on the quick charging means, detecting a charged state of the battery, and turning off the quick charging means when the charged state of the battery reaches a predetermined value and turning on a predetermined one of the slow charging circuits in response to an on/off state of the power supply switch.

Figure 3:
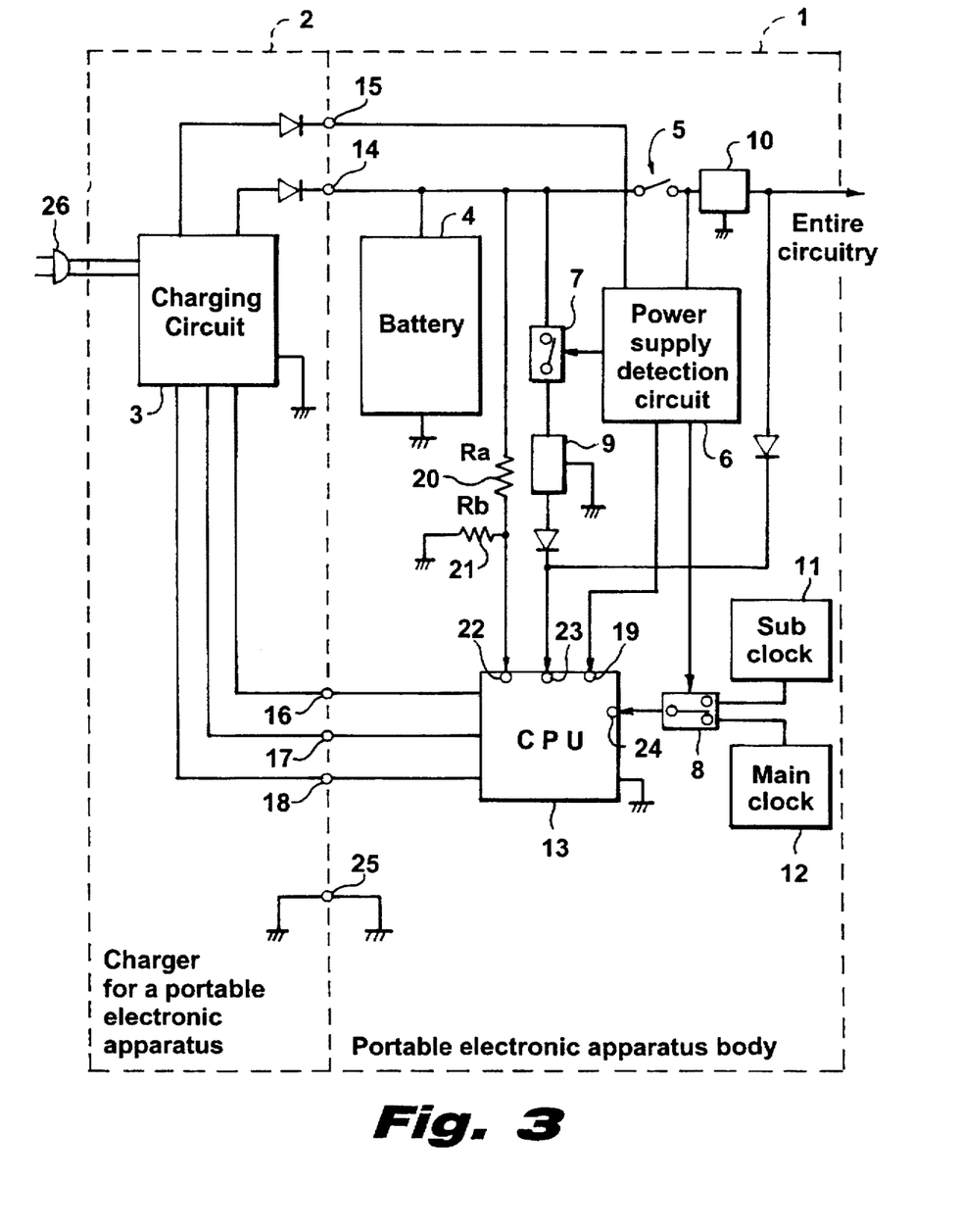
FIG. 3 is a block diagram showing a connection between a portable electronic apparatus body and a charger for a portable electronic apparatus of an embodiment of the present invention.

In other words, with the charge controlling method for a portable electronic apparatus of the present invention, means (control terminal a 16, control terminal b 17, control terminal c 18 and voltage detection terminal 22 of FIG. 3) for controlling the portable electronic apparatus charger directly from the CPU in the inside of the portable electronic apparatus body is provided, the necessity for control circuits such as a charge current control circuit and a full charge detection circuit in the portable electronic apparatus charger is eliminated.

Further, since means (power supply detection circuit 6, switch a 7, switch b 8 and regulator a 9 of FIG. 3) for supplying an electric current to the CPU to allow the CPU to operate with a sub clock signal even when the power supply to the portable electronic apparatus body is in an off state is provided, if the portable electronic apparatus body is connected to the portable electronic apparatus charger, then the CPU and only a limited number of the other circuits in the inside of the portable electronic apparatus body are allowed to operate as a control circuit for the portable electronic apparatus charger even when the power supply to the portable electronic apparatus body is in an off state. Consequently, the battery attached to or loaded in the portable electronic apparatus body can be charged merely by connecting the portable electronic apparatus charger and the portable electronic apparatus body to each other.

DETAILED DESCRIPTION OF THE
PREFERRED EMBODIMENT

Figure 4:
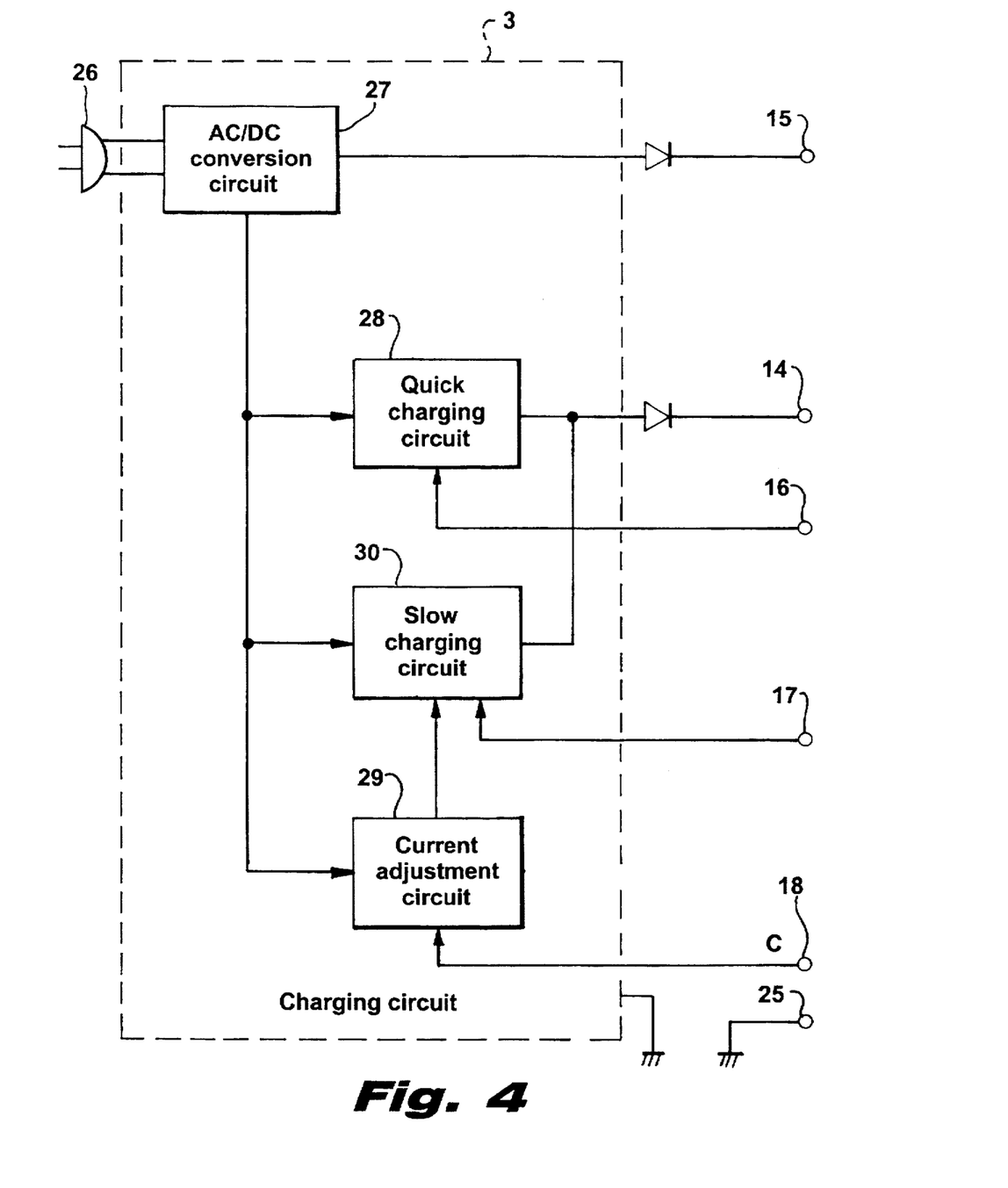
FIG. 4 is a block diagram of a charging circuit provided in the inside of the charger for a portable electronic apparatus.
Figure 5:
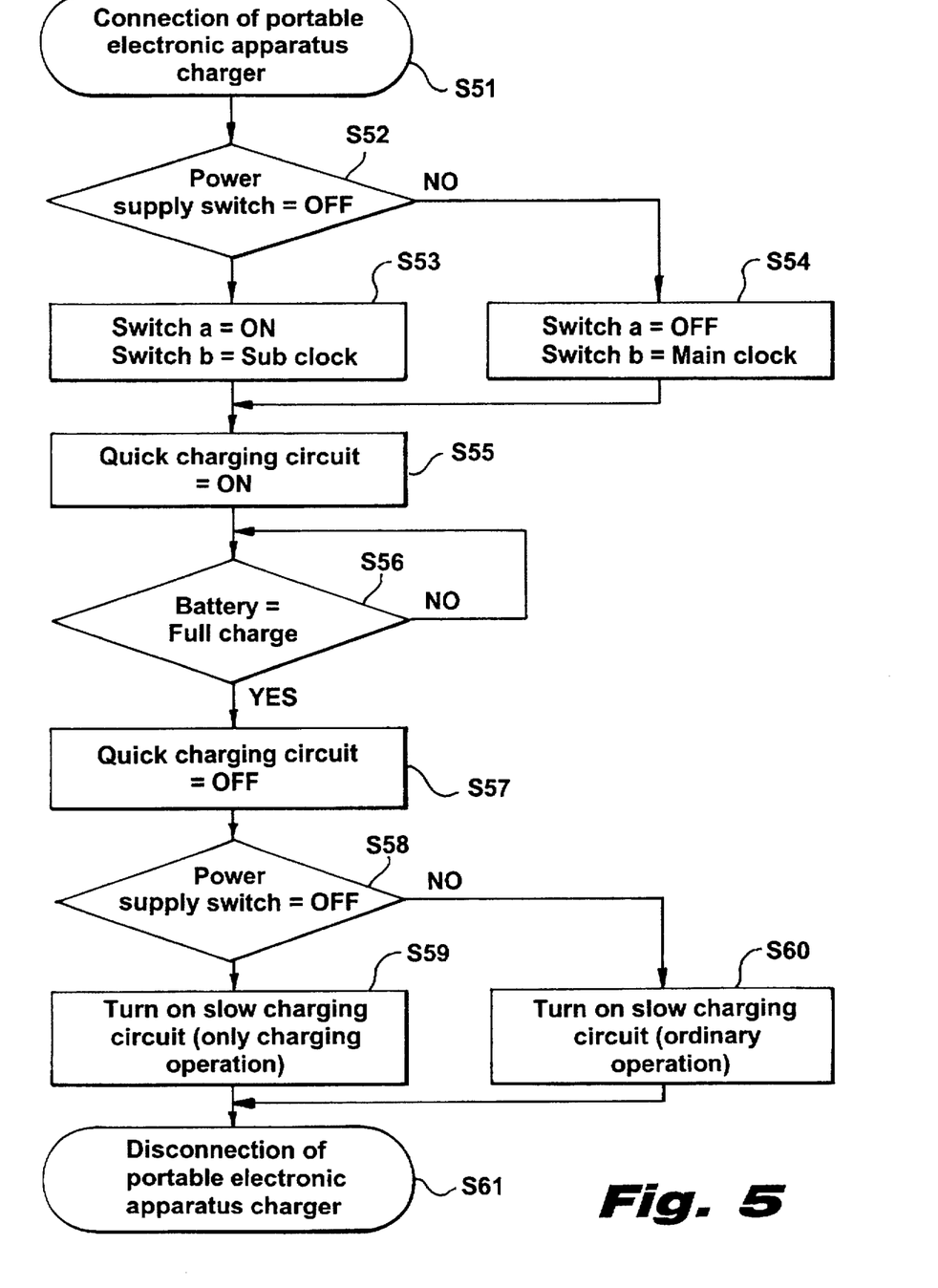
FIG. 5 is a flow chart illustrating operation of the portable electronic apparatus body and the charger for a portable electronic apparatus.

Next, an embodiment of the present invention is described with reference to the drawings. FIG. 3 is a block diagram showing a connection between a portable electronic apparatus body and a charger for a portable electronic apparatus of the embodiment of the present invention. FIG. 4 is a block diagram of a charging circuit provided in the inside of the charger for a portable electronic apparatus, and FIG. 5 is a flow chart illustrating operation of the portable electronic apparatus body and the charger for a portable electronic apparatus. Referring to those figures, reference numeral 1 denotes the portable electronic apparatus body, 2 the charger for a portable electronic apparatus, 3 the charging circuit, 4 a battery, 5 a power supply switch, 6 a power supply detection circuit, 7 a switch a, 8 a switch b, 9 a regulator a, 10 a regulator b, 11 a sub clock, 12 a main clock, 13 a CPU, 14 a power supply terminal a, 15 a power supply terminal b, 16 a control terminal a, 17 a control terminal b, 18 a control terminal c, 19 a task switching terminal, 20 a resistor Ra, 21 a resistor Rb, 22 a voltage detection terminal, 23 a VDD terminal, 24 a clock input terminal, 25 a GND terminal, 26 a commercial power supply receptacle, 27 an AC/DC conversion circuit, 28 a quick charging circuit, 29 a current adjustment circuit, and 30 a slow charging circuit.

When the portable electronic apparatus charger 2 is coupled to the portable electronic apparatus body 1, the power supply terminal 14 forms an electrical connection with the positive terminal of battery 4 as shown in FIG. 3. Further, the input/output terminal of battery 4 is connected to entire circuitry of the portable electronic apparatus body 1 via power supply switch 5 and regulator b 10, and is connected to voltage detection terminal 22 of CPU 13 and resistor Rb 21 via resistor Ra 20. The input/output terminal of battery 4 is further connected to VDD terminal 23 of CPU 13 via switch a 7 and regulator a 9.

Connected to an input terminal of power supply detection circuit 6 is the other power supply terminal b 15 to be connected to charging circuit 3 of portable electronic apparatus charger 2, and to the other input terminal of power supply detection circuit 6, an output terminal of power supply switch 5 is connected. Three terminals of power supply detection circuit 6 on the output side are connected to a control circuit for switch a 7, another control circuit for switch b 8 and task switching terminal 19 of CPU 13.

Sub clock 11 is connected to one of input terminals of switch b 8 while main clock 12 is connected to the other input terminal of switch b 8, and an output terminal of switch b 8 is connected to clock input terminal 24 of CPU 13. Further, an output terminal of regulator b 10 is connected to VDD terminal 23 of CPU 13.

The three controlling output terminals of CPU 13 to be connected to charging circuit 3 are connected to quick charging circuit 28, slow charging circuit 30 and current adjustment circuit 29 of charging circuit 3 via control terminal a 16, control terminal b 17 and control terminal c 18 for connection, respectively as shown in FIG. 4.

Battery 4 is a rechargeable cell. Power supply detection circuit 6 detects from an output voltage of power supply terminal 15 whether or not portable electronic apparatus charger 2 is connected to portable electronic apparatus body 1 and detects from an output voltage of power supply switch 5 whether power supply switch 5 is on or off, and outputs, in response to the on/off state of the power supply switch 5, a voltage of a HIGH or LOW level (hereinafter referred to as control signal) for selecting a regulator which should supply power to CPU 13 to the control circuit of switch a 7 and outputs another control signal for selection of a clock signal to be supplied to CPU 13 to the control circuit of switch b 8 and besides outputs to task switching terminal 19 a further control signal for notification of presence or absence of a connection of portable electronic apparatus charger 2 and an on or off state of power supply switch 5. Regulator a 9 is a low capacity regulator which supplies an electric current to CPU 13 only when power supply switch 5 is off and portable electronic apparatus body 1 is to be charge controlled, and regulator b 10 is a regulator which supplies an electric current to the circuits of portable electronic apparatus body 1 including CPU 13 when power supply switch 5 is on and portable electronic apparatus body 1 is in an ordinary operation state. Main clock 12 provides a system clock signal to be supplied to clock input terminal 24 of CPU 13 when portable electronic apparatus body 1 is in an ordinary operating state. Meanwhile, sub clock 11 provides a system clock signal to be supplied to clock input terminal 24 of CPU 13 only when charge control is performed, and is used since it has a frequency lower than that of the system clock signal of main clock 12 and the current consumption required is lower than main clock 12. CPU 13 controls the entire portable electronic apparatus body 1 and controls charging conditions. Resistor Ra 20 and resistor Rb 21 divide a terminal voltage of battery 4 to a voltage which can be measured by CPU 13.

As seen in FIG. 4, an AC input from commercial power supply receptacle 26 is supplied to AC/DC conversion circuit 27, and a DC output of AC/DC conversion circuit 27 is connected to quick charging circuit 28, current adjustment circuit 29 and slow charging circuit 30. Outputs of quick charging circuit 28 and slow charging circuit 30 are both connected to power supply terminal a 14 connected to portable electronic apparatus body 1, and the output side of current adjustment circuit 29 is connected to slow charging circuit 30. As described hereinabove, the input side of current adjustment circuit 29 is connected to control terminal c 18; the input side of quick charging circuit 28 is connected to control terminal a 16, and the input side of slow charging circuit 30 is connected to control terminal b 17.

AC/DC conversion circuit 27 is a circuit for converting an AC commercial power supply into DC power. Quick charging circuit 28 adjusts a DC voltage outputted from AC/DC conversion circuit 27 and outputs a fixed electric current (hereinafter referred to as constant current) for quickly charging battery 4. Current adjustment circuit 29 is a circuit for adjusting an electric current to be outputted from slow charging circuit 30 to power supply terminal a 14 upon slow charging. When portable electronic apparatus body 1 is in an ordinary operation state and in a slow charging state, current adjustment circuit 29 is on via control terminal c 18 and supplies a sum of an electric current for compensation for self-discharge of battery 4 and a current corresponding to power consumption in ordinary operation from slow charging circuit 30 to power supply terminal a 14. When portable electronic apparatus body 1 is in a slow charging state while only a charging operation is performed, current adjustment circuit 29 is off. Consequently, a sum of the electric current for compensation for self-charge of battery 4 and electric current corresponding to power consumption of CPU 13 and only a limited number of the other circuits is outputted from slow charging circuit 30. Slow charging circuit 30 adjusts the dc voltage outputted from AC/DC conversion circuit 27 and outputs constant current for slowly charging battery 4.

Operation will be described with reference to FIGS. 3, 4 and 5. If portable electronic apparatus body 1 is connected to portable electronic apparatus charger 2, then power supply terminal a 14, power supply terminal b 15, control terminal a 16, control terminal b 17 and control terminal c 18 of portable electronic apparatus charger 2 and portable electronic apparatus body 1 are connected to each other, respectively. Power supply detection circuit 6 detects an output voltage of AC/DC conversion circuit 27 outputted to power supply terminal b 15 to detect the connection of portable electronic apparatus body 1 and portable electronic apparatus charger 2 (so far, S51 of FIG. 5). Then, when the terminal voltage of battery 4 appears on the output side of power supply switch 5, since this signifies that power supply switch 5 is in an on state and portable electronic apparatus body 1 is in an ordinary operation state, if a voltage is detected on the output side of power supply switch 5, then power supply detection circuit 6 turns off switch a 7 to stop the input to regulator a 9 so that the output of regulator b 10 may be used as a power supply to CPU 13 and switch b 8 is switched to the main clock 12 (so far, from S52 to S54 of FIG. 5). If the terminal voltage of battery 4 does not appear on the output side of power supply switch 5, power supply switch 5 is in an off state and portable electronic apparatus body 1 is performing only a charging operation. Consequently, since the output of regulator b 10 is not supplied to CPU 13, power supply detection circuit 6 turns on switch a 7 to supply, as a power supply to CPU 13, the output of regulator a 9, while switch b 8 is switched to the sub clock 11 (from S52 to S53 of FIG. 5). Further, in order to notify to CPU 13 whether portable electronic apparatus body 1 is in an ordinary operation state or is performing only a charging operation, power supply detection circuit 6 outputs a control signal to task switching terminal 19 of CPU 13. Thereafter, CPU 13 outputs a control signal for turning on quick charging circuit 28 in order to effect quick charging to quick charging circuit 28 via control terminal a 16 (so far, S55 of FIG. 5). After quick charging circuit 28 is turned on to start quick charging, CPU 13 intermittently measures the terminal voltage of battery 4 at voltage detection terminal 22 via resistor Ra 20. If CPU 13 detects a full charge state of battery 4 by a $-\Delta V$ method from the terminal voltage of battery 4 measured at voltage detection terminal 22, then it outputs a control signal for stopping the quick charging to quick charging circuit 28 via control terminal a 16 (so far, from S56 to S57 of FIG. 5). Further, CPU 13 discriminates from a control signal outputted from power supply detection circuit 6 to task switching terminal 19 whether portable electronic apparatus body 1 is in an ordinary operation condition or is performing only a charging operation. When portable electronic apparatus body 1 is in an ordinary operation state, CPU 13 outputs via control terminal c 18 a control signal for turning on current adjustment circuit 29 and outputs via control terminal b 17 another control signal for turning on slow charging circuit 30 to slow charging circuit 30 in order to add the electric current corresponding to power consumption in ordinary operation of portable electronic apparatus body 1 to the electric current for compensation for self-charge of battery 4 to effect slow charging (so far, from S58 to S60 of FIG. 5). If portable electronic apparatus body 1 is performing only a charging operation, then CPU 13 outputs a control signal for turning off current adjustment circuit 29 via control terminal c 18 to current adjustment circuit 29 and outputs a control signal for turning on slow charging circuit 30 to slow charging circuit 30 via control terminal b 17, in order to add the electric current corresponding to the power consumption of CPU 13 and only a limited number of the other circuits to the electric current for compensation for self-charge of battery 4 (so far, S58 to S59 of FIG. 5).

If portable electronic apparatus body 1 is disconnected from portable electronic apparatus charger 2, then the charging current to battery 4 via power supply terminal a 14 is interrupted. However, when portable electronic apparatus body 1 is in an ordinary operation state, power is supplied from battery 4 to CPU 13 via regulator b 10. Consequently, the ordinary operation of portable electronic apparatus body 1 continues. On the other hand, if portable electronic apparatus body 1 is performing only a charging operation, when power supply detection circuit 6 detects that the voltage from power supply terminal b 15 is interrupted, it outputs a control signal for turning off switch a 7. Consequently, the operation current to CPU 13 is interrupted and portable electronic apparatus body 1 enters a stopping state (so far, S61 of FIG. 5).

As described above, the first effect of the present invention resides in that a control circuit in a charger for a portable electronic apparatus is eliminated. Consequently, the circuitry of the charger for a portable electronic apparatus is reduced in scale.

The reason is that control of the charger for a portable electronic apparatus is performed by a CPU in a portable electronic apparatus body.

The second effect resides in that, whether the portable electronic apparatus body is in an ordinary operation state or a stopping state, a battery built or loaded in the portable electronic apparatus body can be charged only by connecting the portable electronic apparatus body to the charger for a portable electronic apparatus. Consequently, charging of the portable electronic apparatus body which uses the charger for a portable electronic apparatus can be performed readily, and a user can use the portable electronic apparatus body for a long period of time and the operability is improved.

The reason is that, even if the power supply for the portable electronic apparatus body is in an off state, the charger for a portable electronic apparatus can be controlled using the CPU in the portable electronic apparatus body only by connecting the portable electronic apparatus body to the charger for a portable electronic apparatus.

What is claimed is:

1. A portable electronic apparatus having a portable electronic apparatus body, a rechargeable battery, a CPU, and a portable electronic apparatus charger for charging said battery;

said portable electronic apparatus charger comprising quick charging means having a function of quickly charging said battery, and slow charging means having a function of slowly charging said battery, said portable electronic apparatus body comprising a power supply switch for switching on or off a connection from said battery to the entire circuitry of said portable electronic apparatus, connection detection means for detecting connection of said portable electronic apparatus body to said portable electronic apparatus charger, open/close detection means for detecting an on/off state of said power supply switch, and auxiliary power supply means for directly supplying an electric current from said battery to said CPU when said power supply switch is off while charging of said battery is proceeding, said CPU having a charge completion detection function of detecting a charged state of said battery from an output voltage of said battery, and a quick/slow switching controlling function of controlling said quick charging means to an on state and controlling said slow charging means to an off state when the charged state detected by said charge completion detection function is insufficient charge but controlling said quick charging means to an on state when the charged state detected by said charge completion detection function is sufficient charge.

2. A portable electronic apparatus as claimed in claim 1, wherein said slow charging means includes two slow charging circuits having different output electric current values, and said CPU having a controlling function for switching said two slow charging circuits in response to an on or off state of said power supply switch detected by said open/close detection means upon slow charging.

3. A charge controlling method for the portable electronic apparatus as claimed in claim 1, comprising the steps of detecting connection of said portable electronic apparatus to said portable electronic apparatus charger, detecting an on/off state of said power supply switch and turning off said auxiliary power supply means when said power supply switch is on but turning on said auxiliary power supply means when said power supply switch is off, turning on said quick charging means, detecting a charged state of said battery, and turning off said quick charging means and turning on said slow charging means when the charged state of said battery reaches a predetermined value.

4. A charge controlling method for the portable electronic apparatus as claimed in claim 2, comprising the steps of detecting connection of said portable electronic apparatus to said portable electronic apparatus charger, detecting an on/off state of said power supply switch and turning off said auxiliary power supply means when said power supply switch is on but turning on said auxiliary power supply means when said power supply switch is off, turning on said quick charging means, detecting a charged state of said battery, and turning off said quick charging means when the charged state of said battery reaches a predetermined value and turning on a predetermined one of said slow charging circuits in response to an on/off state of said power supply switch.

* * * * *